(No Model.)  3 Sheets—Sheet 1.

J. R. TUCKER & C. C. HINCKLEY.
ELECTRIC METER.

No. 552,309. Patented Dec. 31, 1895.

Witnesses,
E. T. Wray.
Donald M. Carter.

Inventors
John R. Tucker,
Charles C. Hinckley,
by Francis W. Parker,
Atty.

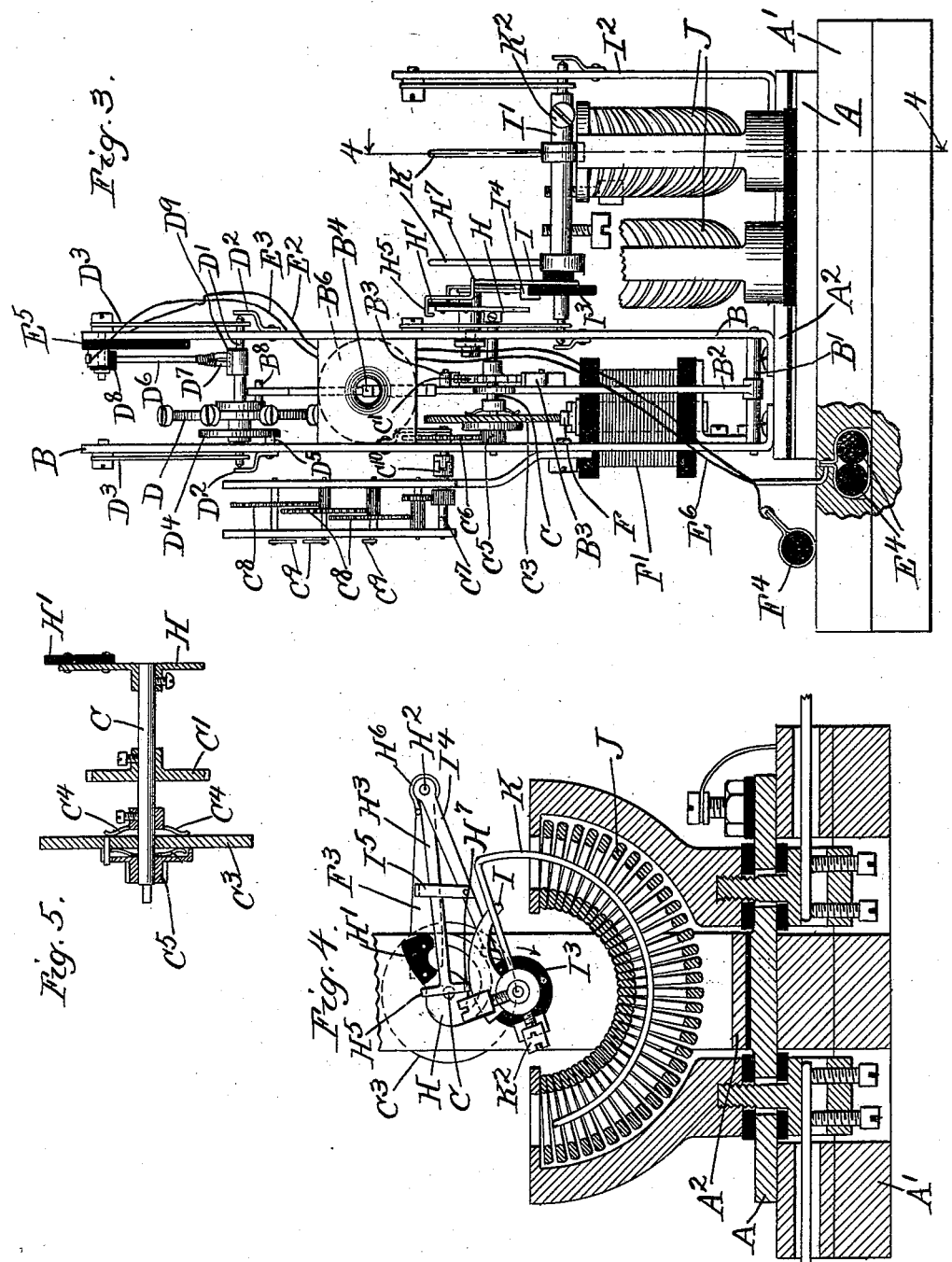

(No Model.) 3 Sheets—Sheet 3.

J. R. TUCKER & C. C. HINCKLEY.
ELECTRIC METER.

No. 552,309. Patented Dec. 31, 1895.

Witnesses.
E. T. Wray
Donald M. Carter

Inventors,
John R. Tucker
Charles C. Hinckley
by Francis W. Parker,
Att'y.

UNITED STATES PATENT OFFICE.

JOHN R. TUCKER AND CHARLES C. HINCKLEY, OF AURORA, ILLINOIS.

ELECTRIC METER.

SPECIFICATION forming part of Letters Patent No. 552,309, dated December 31, 1895.

Application filed March 25, 1895. Serial No. 543,050. (No model.)

*To all whom it may concern:*

Be it known that we, JOHN R. TUCKER and CHARLES C. HINCKLEY, citizens of the United States, residing at Aurora, in the county of Kane and State of Illinois, have invented certain Improvements in Meters, of which the following is a specification.

Our invention relates to electric meters, and has for its object to provide a new and improved meter to accomplish the various purposes for which electric meters are designed.

A complete meter is illustrated in the accompanying drawings, though of course it will be understood that this is only one embodiment of our invention and that our invention in whole or in part might readily be embodied in a device which would on first inspection seem to be quite different from the device here illustrated. We wish, therefore, to say in advance that we do not desire to be limited to the precise form of our mechanism or to the particular features of construction here shown; but we have contemplated many changes in the form of construction which would yet be no material variation from the real invention.

Figure 2:
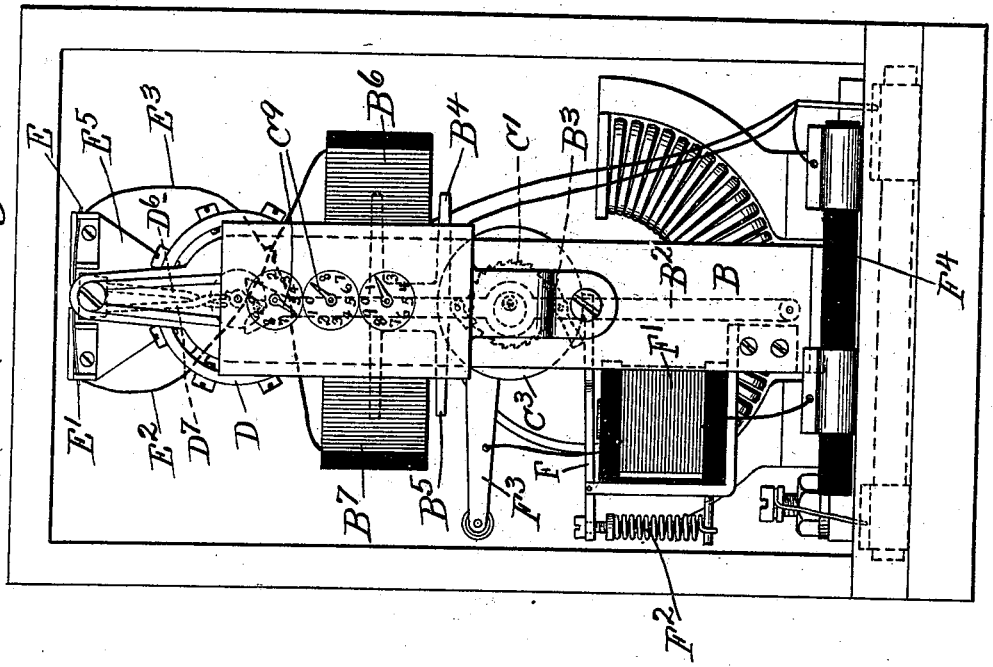
Figure 1:
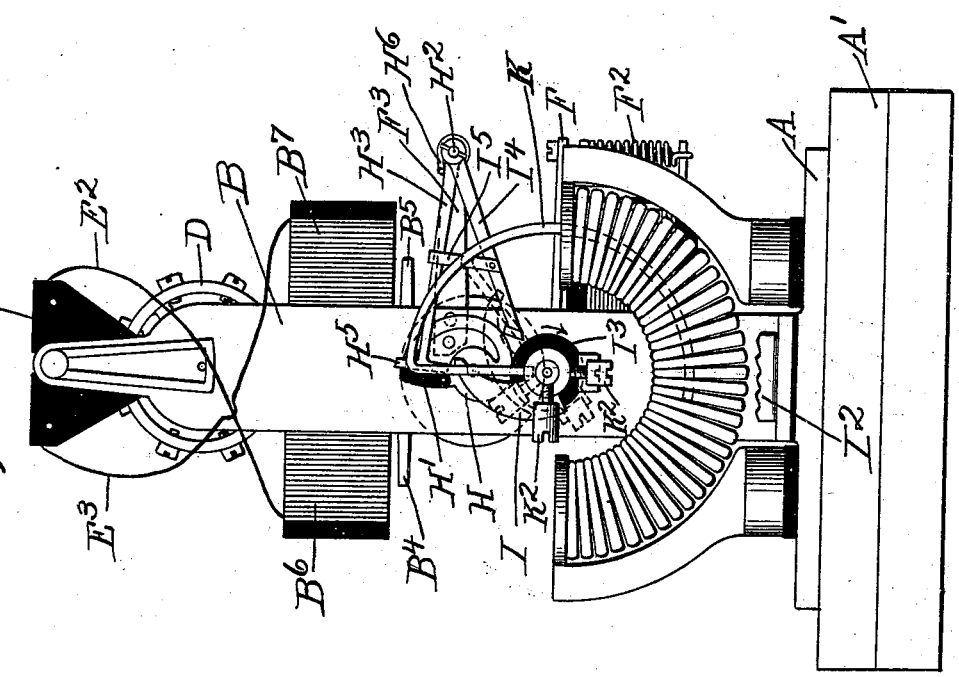
Figure 6:
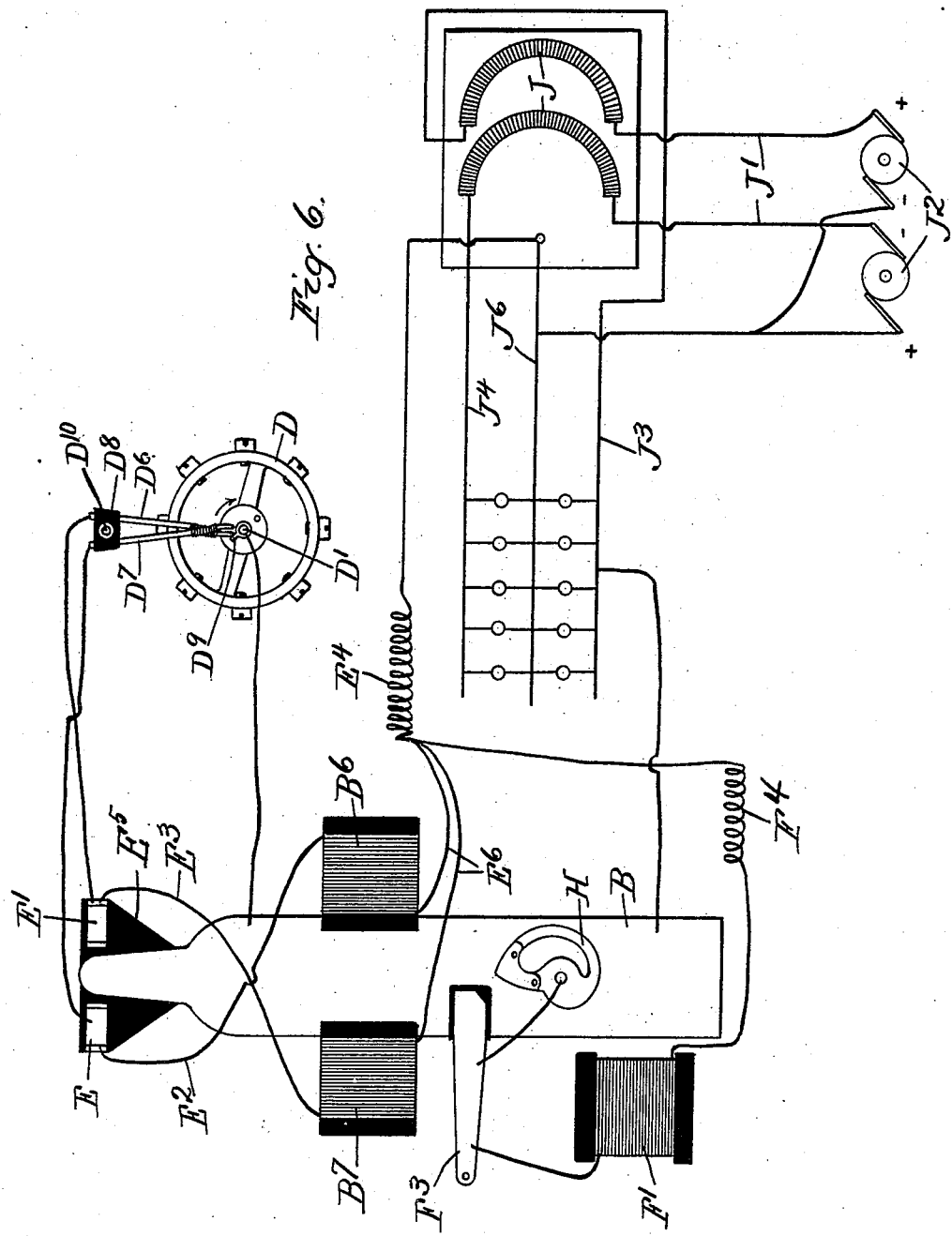

Referring to the drawings, wherein we have illustrated the device, Figure 1 is a rear elevation, the case or cover being supposed to be removed. Fig. 2 is a front elevation with the front cover of the case removed. Fig. 3 is a side elevation. Fig. 4 is a section showing some of the parts in detail, taken on line 4 4 of Fig. 3. Fig. 5 is a detail of the ratchet-shaft. Fig. 6 is a diagrammatic view of the circuits.

Like parts are indicated by the same letters in all the figures.

Briefly stated, one of the principal features of our invention consists in connecting a recording device with an ammeter or the like in such a manner that the length of time during which the recording device is operated in any given period will depend upon and vary with the current in the circuit with which the ammeter is connected.

The working parts of the meter are attached to the plate A, which is secured to the base A'. Resting upon the plate A, but insulated therefrom, is the conducting-strip $A^2$, to which are fastened the supports or standards B B. A shaft or spindle B', journaled in said standards near their base, is provided with an arm $B^2$. (See Fig. 3.) A second shaft C is journaled in the standards B B, and is provided with the ratchet-wheel C', rigidly connected thereto, so as to rotate with the shaft. The arm $B^2$ is provided with the two oppositely-faced pawls $B^3 B^3$, which engage the ratchet-wheel C', said pawls being so situated that when the arm $B^2$ is rocked or vibrated the ratchet-wheel C' and shaft C will be rotated.

Fastened to the arm $B^2$ are the two horseshoe-shaped pieces $B^4 B^5$, of iron or other magnetic material, one member of each piece acting as a core for one of the solenoids $B^6 B^7$. (See Fig. 2.) The upper end of the arm $B^2$ is bifurcated to receive the pin $B^8$ on the balance-wheel D. Said balance-wheel is provided with adjusting-screws and is attached to the spindle D', which passes through openings in the standards B B. The ends of said spindle bear upon the faces of the lugs $D^2 D^2$. The spindle is held in place by the stirrups $D^3 D^3$. A spring $D^4$ is connected to the balance-wheel and to the lug $D^5$ on the standard B. Two depending arms or rods $D^6 D^7$ are pivoted to one of the standards B at $D^{10}$, but are insulated therefrom by the insulating-block $D^8$. These two rods cross at their lower ends, as shown in Fig. 6, but are completely insulated from each other. Said rods are so situated that their lower ends are in proximity with the shaft D', the end of one rod being normally in contact with the lug $D^9$ on the shaft D'. By this arrangement the lug $D^9$ is alternately brought into contact with the rods $D^6 D^7$ when the shaft D' is oscillated. The upper end of the rod $D^6$ is connected with the spring E', and the upper end of rod $D^7$ is connected with spring E. Said springs are attached to the insulating-block $E^5$ and are connected by wires $E^2 E^3$ with the magnets or solenoids $B^6 B^7$. Said solenoids are connected by wires $E^6 E^6$ through the resistance $E^4$ to the main line-wire $J^6$. As shown in the drawings, this resistance consists of two carbon rods having a metallic conductor connected thereto at each end, so that the current passes through the carbon rods.

The shaft C is provided with the wheel $C^3$, which is connected thereto by a friction-clutch of any suitable description. As shown in the drawings, the wheel $C^3$ is loose on the shaft C, but is made to revolve with said shaft by the frictional contact with the springs $C^4$ $C^4$, which are fastened to said shaft. A pinion $C^5$ is rigidly connected to the wheel $C^3$ and meshes with the pinion $C^6$ on the shaft $C^7$ of the recording device. This recording device is of the ordinary construction, consisting of the pinions $C^8$ and indicating-hands $C^9$, and will need no further description. The shaft $C^7$ is divided and connected by means of the clutch $C^{10}$, so that the recording mechanism may be removed without disturbing the rest of the mechanism.

The wheel $C^3$ is preferably provided with a roughened periphery. The armature F of the magnet F' is normally forced against the periphery of said wheel by the spring $F^2$ when the magnet F' is not energized, and acts as a brake to prevent said wheel from rotating. It will thus be seen that the recording mechanism will not be operated while the armature F remains in contact with the wheel $C^3$.

One end of coil of magnet F' is connected to the support $F^3$, which is fastened to the standard B, but which is insulated therefrom. The other end of said coil is connected through the resistance $F^4$ to the wires $E^6$ $E^6$ leading from the solenoids $B^6$ $B^7$. One end of the shaft C projects beyond the standard B and is provided with a cam H. Said cam is provided with an insulating-piece H', which projects beyond its periphery. The support $F^3$ is provided at its end with a pin $H^2$, upon which is journaled the movable arm $H^3$. The outer end of the arm $H^3$ is provided with the projection $H^5$, adapted to make contact with the periphery of the cam H. Said arm is held in contact with said cam by means of the spring $H^6$. Said arm $H^3$ is also provided with the projection $H^7$, which is adapted to make contact with a cam I on the shaft I'. Said shaft is supported by the standards B and $I^2$. The cam I is insulated from the shaft I'. Associated with the cam I is an insulating-washer $I^3$, against which normally bears the arm $I^4$, which is journaled on the pin $H^2$. Said arm $I^4$ is so shaped at its outer end that when in contact with the washer $I^3$ said washer is prevented from rotating in the direction of the arrow. A hook $I^5$ is connected with the arm $I^4$ and is adapted to be engaged by the arm $H^3$ during certain positions of the cam H. The solenoids J J, which are attached to the plate A but insulated therefrom, are electrically connected with the current-generators and with the circuit to be fed therefrom. This connection is shown diagrammatically in Fig. 6, wherein is shown a three-wire system, the solenoids J J being connected by the wires J' J' with the dynamos $J^2$ and also to the wires $J^3$ $J^4$ of the circuit containing the translating devices. The manner in which these connections are made is shown in Fig. 4.

The solenoids J are provided with the cores K K, which are rigidly connected to the shaft I'. It will thus be seen that when said solenoids are energized the cores K K will be drawn within the coils and the shaft I' and the cam I will thereby be rotated. Connected to the shaft I' are the adjustable weights $K^2$ $K^2$, by which the normal position of the shaft and hence of the cam I may be regulated.

In the drawings herewith presented we have shown a device embodying our invention; but it is evident that the several parts therein shown may be greatly modified and greatly changed, and that the form, construction and arrangement of the entire device may be greatly altered without in any manner departing from the spirit of our invention. It is also evident that we may omit some portions therein shown without in any way modifying the action of the device, and we therefore do not wish to be limited to the construction shown.

The use and operation of our invention are as follows: This meter may be used in any manner desired—for example, to register the amount of current used by any or all consumers. When the meter is connected in circuit the current passes through the solenoids J, and hence the position of the cores K will depend upon the amount of current flowing through the circuit to be metered. The lug $D^9$ on the shaft D' is kept normally in contact with the rods $D^6$ or $D^7$ by means of the coiled spring $D^4$ associated with the wheel D, and hence when the current is turned on there will be a current pass through the meter, such current being traced as follows, assuming lug $D^9$ to be in contact with rod $D^6$, (see Fig. 6:) from wire $J^3$ of the consuming-circuit to the standard B, thence to shaft D', thence through rod $D^6$, spring E', wire $E^3$ to the solenoid $B^7$, thence by wire $E^6$ through resistance $E^4$ to the middle or third wire $J^6$ of the consuming-circuit. As soon as this circuit is completed, the solenoid $B^7$ attracts its core $B^5$ and rocks the arm $B^2$, said arm by means of the pawls $B^3$ $B^3$ causing the shaft C to rotate. The arm $B^2$, on account of its connection with the balance-wheel D through the agency of the pin $B^8$, also rocks the spindle D', so as to move the lug $D^9$ (in the direction of the arrow, Fig. 6) past the ends of the rods $D^6$ $D^7$, so as to break contact with the rod $D^6$. The solenoid $B^7$ then becomes de-energized and the lug $D^9$ is brought into contact with the rod $D^7$. A second circuit is then completed which is traced as follows: from the wire $J^3$ of the consuming-circuit to standard B, thence through shaft D' and lug $D^9$ and rod $D^7$ to spring E, thence by wire $E^2$ through the solenoid $B^6$, and thence by wire $E^6$ through resistance $E^4$ to the middle or third wire $J^6$ of the consuming-circuit. The solenoid $B^6$ is now energized and attracts its core $B^4$, thus moving or rocking the arm $B^2$ in the opposite direction to that in which it was moved by the solenoid $B^7$. This motion of the arm $B^2$ moves the balance-wheel D and rod D' and causes the lug $D^9$ to pass the ends of the rods $D^7$ and $D^6$, breaking connection with the rod $D^7$. The solenoid $B^6$ now being de-energized, the coiled spring $D^4$, which is associated with the balance-wheel, moves said balance-wheel and associated parts so as to bring the lug $D^9$ in contact with the rod $D^6$. The operation as described above is now repeated.

The pawls $B^3 B^3$ on the arm $B^2$ are so constructed that the ratchet-wheel $C'$ and shaft $C$ are rotated in one direction only, regardless of the direction in which the arm $B^2$ is moved.

The construction of the balance-wheel D and its connection to the arm $B^2$ insure isochronal vibration of the arm $B^2$, and hence the ratchet-wheel $C'$ and shaft C are revolved at a uniform rate of speed, and hence the revolutions of the shaft will always require equal lengths of time. The cam H on the end of said shaft will therefore be revolved at a uniform rate of speed while the meter is in circuit.

The shaft C is moved continuously while the meter is in circuit; but the recording device is only operated during certain definite intervals during each revolution of the shaft C, the length of such intervals depending upon the amount of current flowing through the solenoids J J. The manner in which this result is brought about is as follows: The recording mechanism is operated by means of the wheel $C^3$. Said wheel is loose upon the shaft C, but is made to rotate therewith by the frictional contact of the springs $C^4 C^4$. Normally such wheel is held stationary by means of the armature F of the magnet $F'$, and while so held the recording mechanism remains inoperative. The magnet $F'$ is so connected with the circuit as to be energized so as to pull down its armature and release the wheel $C^3$ during a portion of the revolution of the shaft C, the connection being such that the length of time during which said armature is attracted varies with and depends upon the current flowing through the solenoids J J. The circuit through the magnet $F'$ will be completed during the time that the projection $H^5$ on the arm $H^3$ is in contact with the metallic portion of the cam H, the circuit then being traced as follows: from wire $J^3$ to standard B, thence through cam H, arm $H^3$, support $F^3$, magnet $F'$, resistance $F^4$, to the wires $E^6$, and thence through resistance $E^4$ to the wire $J^6$ of the consuming-circuit. The cam I on the shaft $I'$ is so situated that the projection $H^7$ of the arm $H^3$ rests thereon during a portion of the revolution of the cam H, and said cam H is so shaped that when the projection $H^7$ rests upon the cam I the arm $H^3$ will be out of contact with the cam H, and hence the circuit through the magnet $F'$ will be broken.

When very little current is passing through the solenoids J J the cam I will be substantially in the position shown in Fig. 1, and hence the arm $H^3$ will be out of contact with cam H during the greater part of its revolution. It will therefore be seen that when these conditions exist the recording apparatus is operated only a very short time during each revolution of the shaft C and cam H. If the current in the consuming-circuit and hence in the solenoids J J increases, the cores K K will be drawn farther within said solenoids and the cam I will be moved downwardly, so that the portion which is in contact with arm $H^3$ will be lower down, and hence said arm $H^3$ will not be out of contact with the cam H for as long a time during each revolution. It will therefore be seen that the construction of this cam is such that an increase of current in the coils of the solenoids J J will bring about a longer period of contact between the arm $H^3$ and the cam H during each revolution of said cam, and hence the recording mechanism will be operated for a greater length of time during each of such revolutions. It will therefore be seen that by making the cams H and I of certain relative shapes we may easily control the length of time in which the recording mechanism is operated during each revolution of the cam H, and that we may further make such time depend directly upon the amount of current flowing in the consuming-circuit. It will therefore be seen that by constructing the recording device with respect to the shape of these cams, or, vice versa, by shaping the cams in accordance with the construction of the recording device, we may be able to calibrate the instrument so as to correctly register the current in the consuming-circuit.

When there is very little current flowing through the solenoids J J, the weight of the arm $H^3$, when in contact with the cam I, would ordinarily force said cam downwardly and cause the cam and cores of the solenoids to take a position which would indicate a greater amount of current than was actually flowing through the circuit. Under these conditions the recording device would indicate more current than was consumed in the circuit, especially when only a small amount of current was being used. To obviate this we provide a brake which prevents the cam I from being rotated by the weight of the lever $H^3$. This brake consists of the arm $I^4$ and insulating-washer $I^3$. The arm $I^4$ is so constructed that its sharp end bears against the washer $I^3$ (see Fig. 4) and prevents said washer and cam H from moving in the direction of the arrow. If this brake were to be in position at all times, the position of the cam I would not be altered by an increase in current. In order to allow said cam to be moved by an increase of current, we provide the arm $I^4$ with the hook $I^5$, said hook being so positioned that it engages the arm $H^3$ during a portion of the revolution of the cam H. The engagement between the arm $H^3$ and hook $I^5$ causes the arm $I^4$ to be moved upwardly and out of contact with the washer $I^3$. The cores K K are then free to adjust themselves with respect to the current flowing through the solenoid. The arm $H^3$ is lifted so as to engage the hook $I^5$ by the projection $H^5$ coming in contact with the insulating-piece $H'$. The arm $I^4$ is only free from the washer $I^3$ a short time, and during this time the arm H³ is also out of contact with the cam H, the parts being so constructed that the arm I⁴ comes in contact with the washer I³ before the arm H³ strikes the cam I, and hence the device will again be locked in position before the position of the cam can be changed by the weight of the arm H³.

In our electric meter it will be observed that we have in effect a register which is intermittently operated and at varying portions of successive periods of equal length. We have also a motor which tends to impart continuous motion to the register and which itself keeps up a continuous motion in any event. The periods of action of the register above referred to are each of them longer and preferably several times longer than the period of the reciprocation or oscillation of the motor part which transmits the power to the register.

Our next element is a transmitting mechanism between register and motor and which mechanism embraces a clutch and brake whereby from a continuously-moving part of the motor the register is intermittently driven.

Our next element is what we have called an "interrupter" or device which by application in any manner whatever is calculated to interrupt the action of the register. We have shown this device as acting to interrupt by means of its engagement with the clutch mechanism; but obviously it could be applied elsewhere and otherwise.

Our next element is what we have called a "controller," though it consists in fact only of those elements and devices whereby the main-circuit responsive device is enabled to control the application of the interrupter. This responsive device is our last important or special element and is, of course, little more than an ammeter or the like.

We claim—

1. In an electric meter the combination of a register with a device responsive to the main current, a vibratory arm adapted by its movement to actuate said register, and an interrupter located between said vibratory arm and said register and adapted to interrupt the operation of the register at intervals.

2. In an electric meter the combination of a register with a device responsive to the main current, a vibratory arm which normally tends to continuously actuate the register, a device separate from said arm but associated therewith in such a manner as to make the vibrations of said arm isochronal, an interrupter for said register and a controller for said interrupter.

3. In an electric meter the combination of a register with a device responsive to the main current, a vibratory arm adapted to actuate said register and which normally tends to continuously actuate the register, an interrupter located between said vibratory arm and the register and adapted to interrupt the action of the register, and a controller adapted to control the effective relation of the interrupter to the register.

4. In an electric meter the combination of a register with a device responsive to the main current, a vibratory arm adapted normally to continuously actuate the register, an interrupter located between said vibratory arm and the register and adapted to interrupt the action of the register, and a controller adapted to control the effective relation of the interrupter to the register, said controller dependent on the responsive device.

5. In an electric meter the combination of a register with a motor to drive the same, a transmitting part having a continuously moving portion from which motion is communicated to the register, and an interrupter adapted to interrupt periodically this transmission of motion, said interrupter comprising a friction clutch and brake mechanism.

6. In an electric meter the combination of a registering device with a motor having a continuously rotating power transmitting shaft, a wheel on said shaft whereby the power is transmitted to the register, a frictional connection between such wheel and the transmitting part and a brake adapted normally to bear against said wheel and prevent it from rotating.

7. In an electric meter in combination with the register of a vibratory arm adapted by its movement to actuate said register, a device responsive to the main current, an interrupter to interrupt the action of the register, and means whereby the interrupter by the action of the responsive device may interrupt the action of the register for varying portions of a succession of uniform periods.

8. In an electric meter the combination of a register with a motor therefor having an oscillating or reciprocating part, transmitting mechanism from the motor to the register, and means whereby the register may be interrupted in its action for varying portions of successive equal periods, which periods cover each a greater time than the period of a single oscillation or reciprocation.

9. An electric meter comprising a rotatable shaft, a vibratory arm operatively connected with said shaft means associated with said arm, by which its vibrations are made isochronal, a recording mechanism, a coil connected in the circuit to be measured, a core for said coil, a controllable connecting mechanism between said shaft and said recording mechanism, and a device associated with said shaft and the core of said coil and adapted to control said connecting mechanism so that the recording mechanism will only be operated during a portion of each revolution of said shaft.

10. An electric meter comprising a rotatable shaft, a vibratory arm operatively connected with said shaft a series of electro magnets adapted to be alternately energized so as to vibrate said arm, a recording mechanism, a coil connected in the circuit to be measured, a core for said coil, connecting mechanism between said shaft and said recording mechanism associated with said shaft and with the core of said coil, and adapted to control the said connecting mechanism so that the recording mechanism will only be operated during a portion of each revolution of said shaft.

11. An electric meter comprising a vibratory arm, a recording mechanism, a coil adapted to be connected in the circuit to be measured, a core for said coil, a shaft adapted to be rotated while the current is flowing in the circuit to be measured, a series of electro magnets so situated that when alternately energized they keep said vibratory arm in motion, means associated with said arm by which the circuits through said magnets are controlled, connecting mechanism between said shaft and the recording mechanism, said connecting mechanism controlled by an electromagnet, and a circuit making and breaking device in the circuit of said magnet, said circuit making and breaking device associated with said shaft and the core of said coil in such a manner as to be operated to close the circuit through said magnet during a portion of each revolution of said shaft.

12. An electric meter comprising a vibratory arm, a series of electro-magnets adapted to be alternately energized so as to vibrate said arm while the meter is connected in circuit, a shaft adapted to be rotated by said vibrating arm, a recording mechanism, a controllable connection between said shaft and said recording mechanism, an electro-magnet by which said connecting mechanism is controlled, a cam on the end of said shaft and in circuit with said electro-magnet, an arm also in circuit with said electro-magnet and adapted to make contact with said cam during a portion of each of its revolutions, a solenoid connected in the circuit to be measured, a core for said solenoid, a cam connected with said core and associated with said arm so as to vary the interval of contact between said arm and said first mentioned cam when the position of the core varies, the mechanism by which the recording mechanism is controlled being so constructed that the length of time during which the recording mechanism is operated varies with and depends upon the position of the core of said coil.

13. In an electric meter, the combination of a register with a device responsive to the main current, a vibratory arm operatively connected with said register means by which said arm is vibrated, a spring actuated balance wheel, associated with said vibratory arm and adapted to regulate its motion, an interrupter adapted to interrupt the action of the register and a controller for said interrupter.

JOHN R. TUCKER.
CHARLES C. HINCKLEY.

Witnesses:
   FRANCIS M. IRELAND,
   DONALD M. CARTER.